Figure 1:
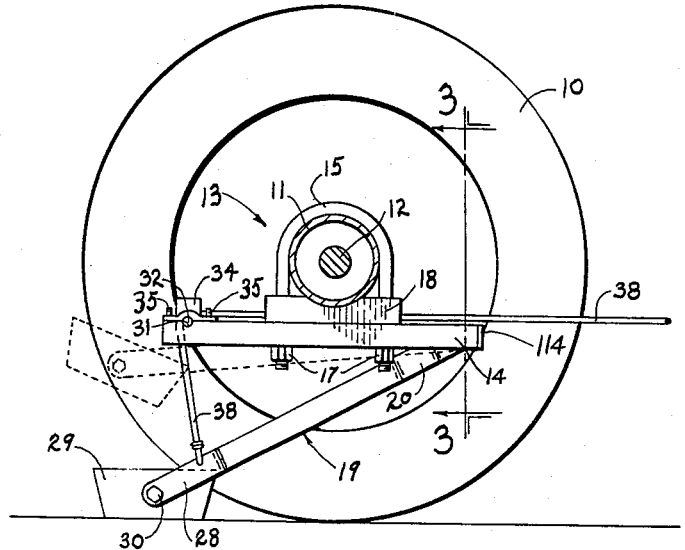

Jan. 28, 1964 — W. F. JERVIS — 3,119,465
ANTI-SKID DEVICE

Filed Oct. 10, 1962 — 3 Sheets-Sheet 1

INVENTOR.
William F. Jervis
BY Williams & Kreske
Attorneys

Jan. 28, 1964   W. F. JERVIS   3,119,465
ANTI-SKID DEVICE
Filed Oct. 10, 1962   3 Sheets-Sheet 2

INVENTOR.
William F. Jervis
BY
Williams & Krecke
Attorneys

Jan. 28, 1964

W. F. JERVIS 3,119,465

ANTI-SKID DEVICE

Filed Oct. 10, 1962

3 Sheets-Sheet 3

INVENTOR.
William F. Jervis
BY
Williams & Kreske

Attorneys

3,119,465
ANTI-SKID DEVICE
William F. Jervis, 471 Charles St., Cortland, Ohio
Filed Oct. 10, 1962, Ser. No. 229,574
2 Claims. (Cl. 188—5)

The present invention relates to an anti-skid device for wheeled land vehicles, more particularly to a device for reducing the tendency of automobiles and the like to slide sideways on ice or snow, and the principal object of the invention is to provide new and improved devices of the character described.

It has heretofore been proposed to pivotally support a blade-like member adjacent the non-steerable, usually the rear, wheels of the vehicle and to resiliently force such blade into engagement with the ice or snow covered road surface when transverse stability of the vehicle is to be increased. While devices of this type will markedly improve transverse stability of a vehicle traveling over ice or snow, such devices have never achieved commercial success since most have been complicated, expensive, and ill-adapted for universal use.

The present invention provides a simple, fool-proof, anti-skid device which is readily adapted for use, without modification, on many different makes and models of modern automotive vehicles. These and other advantages will readily become apparent from a study of the following description and from the drawings appended hereto.

Figure 2:
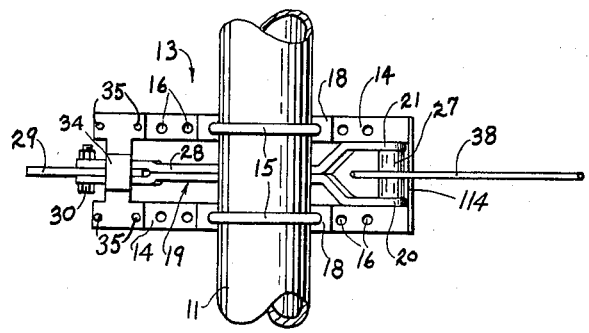
Figure 3:
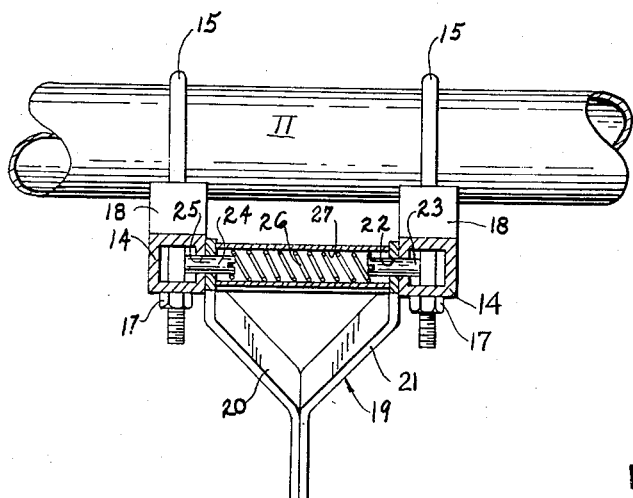
Figure 4:
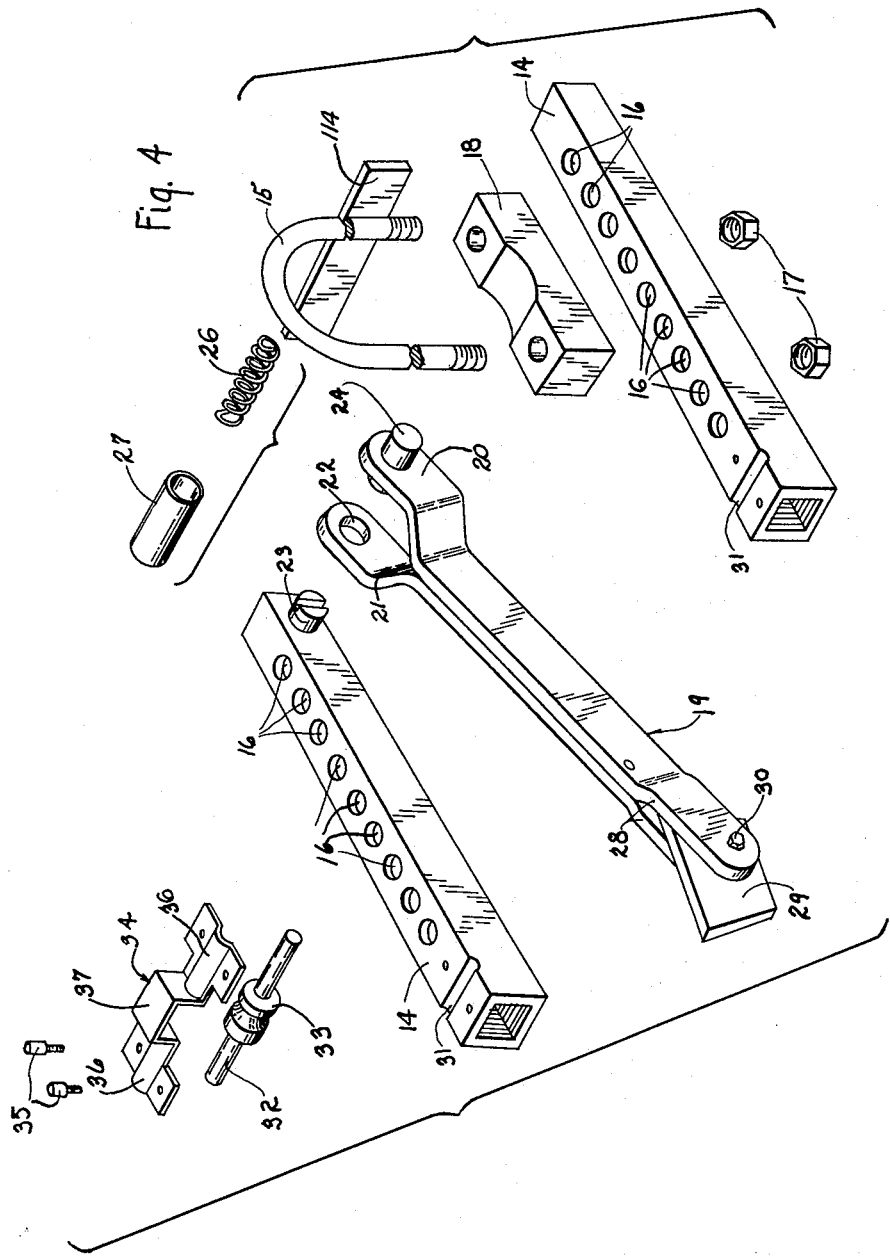
Figure 5:
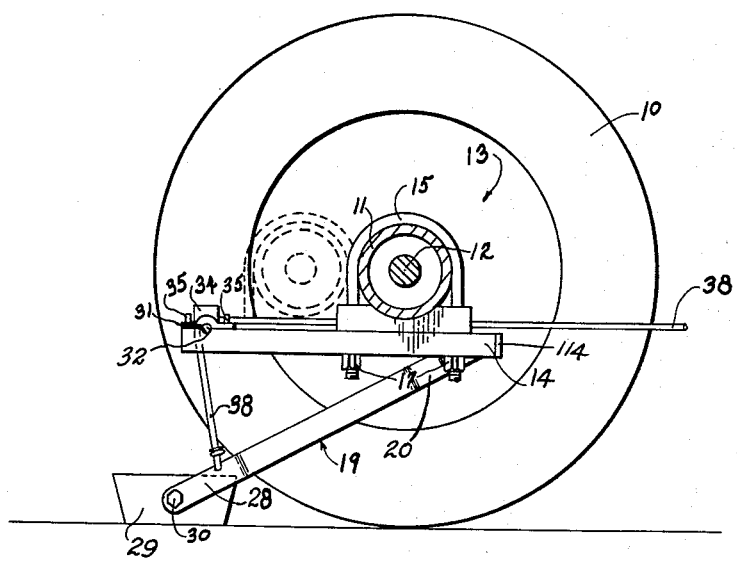

In the drawings accompanying this specification and forming a part of this application there is shown, for purpose of illustration, an embodiment which the invention may assume, and in these drawings:

FIGURE 1 is a fragmentary view showing a preferred embodiment of the present invention attached to an automobile or the like and illustrating in full lines the device positioned for use to improve transverse stability and in phantom lines the device retracted from its use position, FIGURE 2 is a plan view of the structure seen in FIGURE 1, FIGURE 3 is an enlarged sectional view generally corresponding to the line 3—3 of FIGURE 1, FIGURE 4 is an exploded perspective view of the invention, and FIGURE 5 is a view similar to FIGURE 1 but illustrating the adaptability of the invention to various makes and models of automotive vehicles.

Referring to FIGURE 1, there is illustrated a rear wheel 10 on the far side of an automotive vehicle, the rear wheel on the near side being removed in the interest of clarity. As is well known, such rear wheels are joined together by an axle housing 11 which encloses axle shafts 12 by means of which the rear wheels are driven to propel the vehicle. Secured to the axle housing 11 adjacent respective rear wheels 10 are a pair of anti-skid devices 13 constructed in accordance with the present invention. Since such devices are identical, only one is herein shown and described.

With reference now to FIGURES 1 through 4, each device 13 comprises a pair of elongated support members 14 secured beneath the axle housing 11 in spaced, side-by-side relation and extending longitudinally of the vehicle, U-bolts 15 embrace the axle housing and their legs extend through apertures 16 in respective members 14 while nuts 17 draw each member tightly to the axle housing. Spacer blocks 18 having an arcuate upper surface are disposed between each member and the axle housing to increase the area of interengagement therebetween. As best seen in FIGURE 4, each support member 14 has a plurality of apertures 16 spaced therealong for a purpose to appear.

Pivotally secured between the forward ends of the support members 14 is an arm 19 having bifurcated end portions. One of the arm end portions provides legs 20, 21 which are spaced-apart an amount to closely fit between the support members 14 as shown in FIGURES 2 and 3. Referring now to FIGURES 3 and 4, leg 21 is apertured at 22 to rotatably receive a pin 23 anchored in one of the support members 14. On the other hand, a pin 24 is anchored in the leg 20 and is rotatably received in an aperture 25 in the other support member 14. The arrangement is such, of course, that with the parts in assembled relation, pins 23, 24 are in axial alignment to provide a pivot about which arm 19 is swingable.

The facing ends of pins 23, 24 are transversely slotted to receive transversely extending portions of a helical torsion spring 26 which spans such pin ends. A tube 27 encloses spring 26 and extends between the legs 20, 21 to protect the spring against accumulations of ice, dirt and the like which might impair its proper functioning. If desired, a plate 114 may extend between and overlie the forward ends of support members 14 to exclude dirt and the like therefrom. As will be clear, spring 26 is adapted to be torsionally stressed, or wound up, so that it will tend to rotate arm 19 about the pivot provided by pins 23, 24 in a counter-clockwise direction as viewed in FIGURE 1.

As previously mentioned, one end of arm 19 provides spaced legs 20, 21. Similarly, the other end of arm 19 provides spaced legs 28 (FIGURES 1, 2 and 4) for closely receiving therebetween a blade member 29 having a straight lower edge. Legs 28 and the blade member are apertured to pass a bolt 30 which cooperates with a nut to tightly clamp the blade member to the arm. It is important that the front and rear edges of the blade 29 are angled as shown in FIGURE 1 to insure that they will not catch on any obstructions while the device is in use.

With the construction as thus far described, it will be clear that each device 13 will have its arm 19 biased by its spring 26 to forceably urge its blade 29 to engage the surface over which the vehicle is traveling. With each blade thus disposed, skidding of the vehicle sideways will be resisted by the lower blade edges digging into the ice or snow covered surface over which the vehicle is traveling.

Since it is undesirable to have the blades 29 engaged with the road surface or the like except when such surface is ice or snow covered, means are provided for elevating each blade device when use of the device is not required. With reference to FIGURES 1, 2 and 4, the upper surface at the rear of each support member 14 provides a transverse recess 31 for rotatably receiving the shaft 32 of a pulley 33. A bracket 34 spans the support members and is suitably secured thereto by screws 35, the end portions of such bracket being arcuately shaped at 36 to provide pockets for rotatably receiving respective ends of shaft 32. The intermediate portion 37 of bracket 34 limits axial movement of the pulley and serves yet another purpose to appear.

Secured in any suitable manner to the free end of arm 19 is a cable 38 which passes over the pulley 33, under the axle housing 11 and extends forwardly of the vehicle to terminate in a suitable mechanism, not shown, by means of which the cable may be pulled forward, preferably from the driver's position in the vehicle. As each cable is pulled forward, each arm 19 will be rotated about its pivot to the phantom line position seen in FIGURE 1 wherein its blade 29 is retracted from engagement with the road surface. As each cable is released, each arm 19 will be returned to the position seen in full lines in FIGURE 1 by its spring 26. The intermediate portion 37 of bracket 34 confines each cable 38 and insures proper engagement thereof with its pulley 33 under conditions when the cable is not tensioned.

As hereinabove mentioned, one of the important features of the present invention is its adaptability to various makes and models of vehicles by virtue of being adjustable longitudinally thereof. This is particularly important with present day automobiles since their soft suspensions and the resulting considerable rear axle housing vertical movement makes it difficult to avoid interference between the anti-skid device and such components as the gas tank, the muffler system, the frame, suspension elements, or other vehicle components.

Referring to FIGURE 4 and as previously mentioned, each support member 14 has a plurality of apertures 16 spaced-apart longitudinally thereof for passing the U-bolt legs. Various pairs of such apertures may be selectively used to variously position the device 13 longitudinally of the vehicle as required for clearance purposes. For example, if the forward leg of respective U-bolts is passed through the foremost aperture 16 of respective support members, as shown in full lines in FIGURE 5, the device arm 19 will be positioned rearwardly of that seen in FIGURE 1. On the other hand, if the rear leg of respective U-bolts is passed through the rearmost aperture of respective support members, as shown in phantom lines in FIGURE 5, the device arm 19 will be positioned forwardly of that seen in FIGURE 1. The use of intermediate apertures 16 will, of course, result in the intermediate positioning of the device arm. Obviously, while but two positions ahead of and two positions behind that shown in FIGURES 1 and 2 have been provided for, even greater adjustment could well be provided for merely by further elongating the support members and providing a greater number of apertures through which the U-bolts may pass.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. An anti-skid device for a vehicle having a pair of axially-spaced road engaging wheels at the rear thereof rotatably supported by an axle assembly providing an axle housing extending transversely of the longitudinal axis of the vehicle, comprising a support formed of a pair of elongated members in spaced, side-by-side relation securable to the underside of the vehicle axle housing for extension longitudinally of the vehicle, an arm having one end pivoted between said support members at the forward parts thereof and having road surface engaging means at its free end, a resilient member and a cable member each connected to said arm and selectively rotating the latter about its pivot in opposite directions, in one direction of rotation about its pivot said arm lowering its road surface engaging means to the road surface and in the opposite direction of rotation said arm raising its road surface engaging means from the road surface, and means securing said elongated support members to the vehicle axle housing and cooperable with selected, longitudinally spaced portions of said support members to variously position the latter and the parts carried thereby longitudinally of the vehicle, said one arm end being bifurcated, wherein the forward part of one of said support members provides a first stub shaft closely receivable within an aperture in the adjoining arm furcation, wherein the other arm furcation provides a second stub shaft spaced axially from but aligned with said first stub shaft and closely receivable within an aperture in the forward part of said other support member, wherein the facing ends of said stub shafts are provided with transverse slots, and wherein said resilient member comprises a torsion spring having respective portions fitting within respective shaft slots for anchoring said spring portions to said arm and said support respectively.

2. The construction of claim 1 wherein said support members each comprises an elongated tube of generally square cross-section and wherein a block is interposed between a support member and the vehicle axle housing and has opposed, vertically spaced surfaces contoured for complementary engagement with the latter and said support member.

References Cited in the file of this patent

UNITED STATES PATENTS

| | | |
|---|---|---|
| 1,004,733 | Besler | Oct. 3, 1911 |
| 1,444,199 | Malcolm | Feb. 6, 1923 |
| 1,503,522 | Taylor | Aug. 5, 1924 |
| 1,708,081 | Coate et al. | Apr. 9, 1929 |
| 2,068,472 | Royer | Jan. 19, 1937 |